US011451801B2

(12) United States Patent
Liao et al.

(10) Patent No.: US 11,451,801 B2
(45) Date of Patent: Sep. 20, 2022

(54) METHODS FOR CODING VIDEO DATA IN PALETTE MODE

(71) Applicant: ALIBABA GROUP HOLDING LIMITED, Grand Cayman (KY)

(72) Inventors: Ru-Ling Liao, Beijing (CN); Mohammed Golam Sarwer, Cupertino, CA (US); Jie Chen, Beijing (CN); Yan Ye, San Diego, CA (US); Jiancong Luo, Skillman, NJ (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/110,858

(22) Filed: Dec. 3, 2020

(65) Prior Publication Data
US 2021/0203961 A1 Jul. 1, 2021

Related U.S. Application Data

(60) Provisional application No. 62/953,582, filed on Dec. 26, 2019.

(51) Int. Cl.
*H04N 19/186* (2014.01)
*H04N 19/124* (2014.01)
*H04N 19/103* (2014.01)
*H04N 19/182* (2014.01)

(52) U.S. Cl.
CPC ......... *H04N 19/186* (2014.11); *H04N 19/103* (2014.11); *H04N 19/124* (2014.11); *H04N 19/182* (2014.11)

(58) Field of Classification Search
None
See application file for complete search history.

(56) References Cited

U.S. PATENT DOCUMENTS

| 10,055,189 | B2* | 8/2018 | Tsai | ............... H04N 19/129 |
| 10,237,575 | B2* | 3/2019 | Tsai | ............... H04N 19/94 |
| 10,659,783 | B2* | 5/2020 | Li | ............... H04N 19/157 |
| 10,735,764 | B2* | 8/2020 | Tsai | ............... H04N 19/593 |
| 11,036,459 | B2* | 6/2021 | Tsai | ............... H04N 19/567 |
| 2011/0007977 | A1 | 1/2011 | Amonou et al. | |
| 2015/0186100 | A1* | 7/2015 | Tsai | ............... H04N 19/70 |
| | | | | 375/240.12 |
| 2015/0264363 | A1* | 9/2015 | Pu | ............... H04N 19/93 |
| | | | | 375/240.02 |
| 2015/0264365 | A1* | 9/2015 | Tsai | ............... H04N 19/593 |
| | | | | 375/240.03 |

(Continued)

OTHER PUBLICATIONS

International search report and written opinion in related International Application No. PCT/US20/63049, dated Feb. 24, 2021 (8 pages).

(Continued)

*Primary Examiner* — Reza Aghevli
(74) *Attorney, Agent, or Firm* — Finnegan, Henderson, Farabow, Garrett & Dunner, LLP

(57) ABSTRACT

The present disclosure provides systems and methods for performing palette coding of video data. According to certain disclosed embodiments, the methods include: classifying pixels of a coding unit into a first plurality of clusters; and determining, according to the first plurality of clusters, a palette table for the coding unit.

17 Claims, 18 Drawing Sheets

(56) References Cited

U.S. PATENT DOCUMENTS

| | | | |
|---|---|---|---|
| 2015/0365695 A1* | 12/2015 | Pu | H04N 19/117 375/240.16 |
| 2016/0057434 A1* | 2/2016 | Lai | H04N 19/105 382/233 |
| 2016/0100171 A1* | 4/2016 | Karczewicz | H04N 19/176 375/240.02 |
| 2016/0227217 A1* | 8/2016 | Karczewicz | H04N 19/463 |
| 2016/0227226 A1* | 8/2016 | Rapaka | H04N 19/593 |
| 2016/0227239 A1* | 8/2016 | Pu | H04N 19/593 |
| 2016/0316214 A1* | 10/2016 | Gisquet | G09G 5/06 |
| 2016/0373756 A1* | 12/2016 | Yu | H04N 19/119 |
| 2017/0034533 A1* | 2/2017 | Chuang | H04N 19/56 |
| 2017/0105002 A1* | 4/2017 | Chuang | H04N 19/182 |
| 2017/0111651 A1* | 4/2017 | Chuang | H04N 19/172 |
| 2017/0195676 A1* | 7/2017 | Chuang | H04N 19/103 |
| 2017/0374372 A1* | 12/2017 | Liu | H04N 19/186 |
| 2017/0374384 A1* | 12/2017 | Xiu | H04N 19/90 |
| 2018/0014034 A1* | 1/2018 | Lai | H04N 19/70 |
| 2018/0027246 A1* | 1/2018 | Liu | H04N 19/197 375/240.02 |
| 2018/0041757 A1* | 2/2018 | Liu | H04N 19/186 |
| 2018/0091829 A1* | 3/2018 | Liu | H04N 19/436 |
| 2018/0152714 A1* | 5/2018 | Sun | H04N 19/186 |
| 2018/0278945 A1* | 9/2018 | Hsiang | G06T 9/00 |
| 2018/0307457 A1* | 10/2018 | Tsai | H04N 19/463 |
| 2019/0116380 A1* | 4/2019 | Chuang | H04N 19/463 |
| 2019/0149843 A1* | 5/2019 | Tsai | H04N 19/93 375/240.03 |
| 2019/0246122 A1* | 8/2019 | Zhang | H04N 19/91 |
| 2019/0281312 A1* | 9/2019 | Chen | H04N 19/119 |
| 2020/0322630 A1* | 10/2020 | Tsai | H04N 19/593 |
| 2021/0203930 A1* | 7/2021 | Chao | H04N 19/176 |

OTHER PUBLICATIONS

Bross et al., "Versatile Video Coding (Draft 7)," JVET-P2001-vE, 16$^{th}$ Meeting: Geneva, CH, Oct. 1-11, 2019, 488 pages.

Chao et al., "CE8-1.3: Line-based CG Palette Mode," JVET-P0077, 16$^{th}$ Meeting: Geneva, CH, Oct. 1-11, 2019, 6 pages.

Chen et al., Algorithm description for Versatile Video Coding and Test Model 7 (VTM 7), JVET-P2002-v1, 16$^{th}$ Meeting: Geneva, CH Oct. 1-11, 2019, 89 pages.

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jem, https://jvet.hhi.fraunhofer.de/svn/svn_HMJEMSoftware.

Joshi et al., "High Efficiency Video Coding (HEVC) Screen Content Coding: Draft 6," JCTVC-W1005-v4, 23$^{rd}$ Meeting: San Diego, USA, Feb. 19-26, 2016, 673 pages.

Lin et al., "CE3-2.1.1 and CE3-2.1.2: Removing 2x2, 2x4, and 4x2 chroma CBs", JVET-O0050, Gothenburg, Jul. 2019, 10 pages.

Segall et al., "Joint Call for Proposals on Video Compression with Capability beyond HEVC," JVET-H1002 (v6), 8$^{th}$ Meeting: Macao, CN, Oct. 18-24, 2017, 27 pages.

Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

Example of a block coded in palette mode

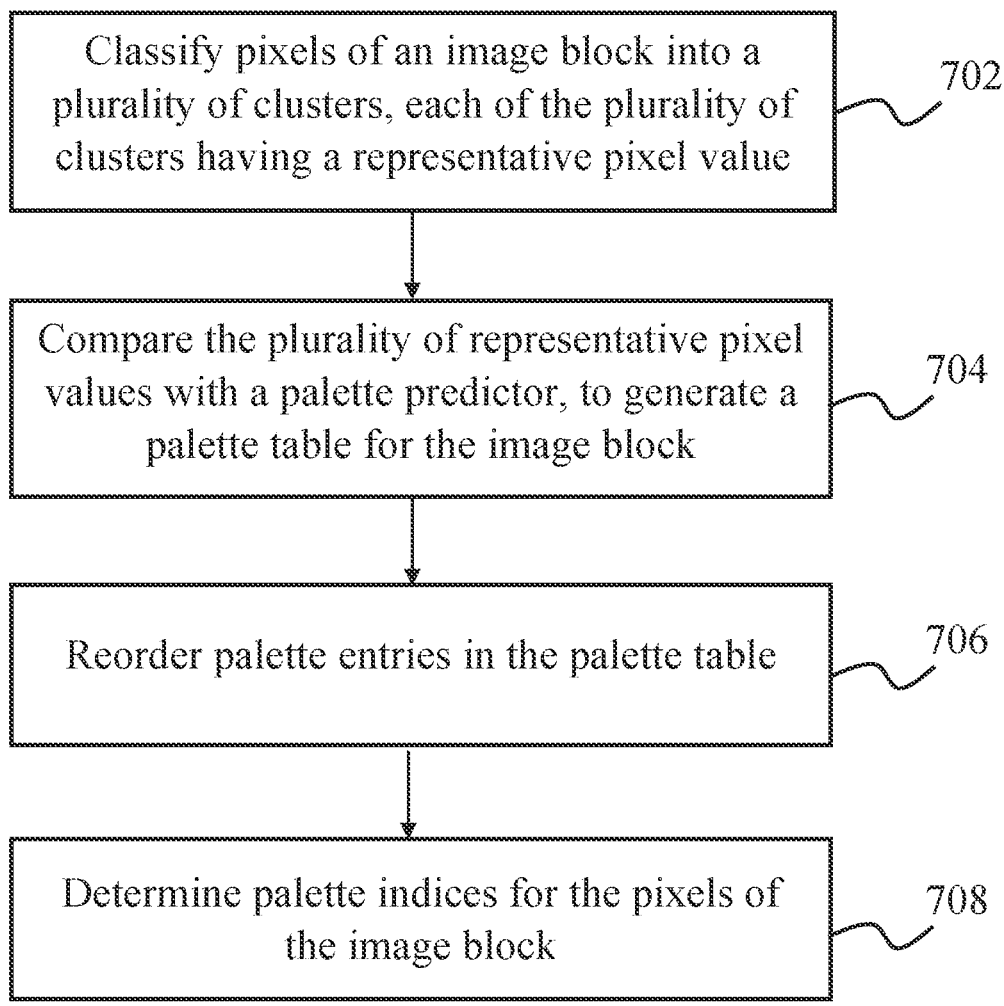
FIG. 7: Exemplary process for generating palette table for an image block

```
curPalette[] specifies a current palette that stores the representative color
numCurEntry specifies the number of entry in the current palette
qpTh specifies a QP dependent threshold
errorSAD(A, B, numComp) specifies the SAD between A and B. numComp specifies the number of componets are taken into consideration
updateColor(A, B) specifies the representative color of current palette entry A is updated with pixel B
initColor(A, B) specifies the representative color of current palette entry A is set to pixel B
predPalette[] specifies a palette predictor
numPredEntry specifies the number of palette predictor
newCost(A) specifies the cost of signaling the representative color A as new color entry
predCost(A, B) specifies the cost of replacing the representative color A with palette predictor B
```

```
numCurEntry = 0
for( each pixel including Y, U, V component ) {
    newEntry = true
    minCost = a maximum value
    bestEntry = -1
    for( int i = 0; i < numCurEntry; i++ ) {
        if( errorSAD( curPalette[ i ], pixel, 3 ) < qpTh && errorSAD( curPalette[ i ], pixel, 3 ) < minCost ) {
            newEntry = false
            minCost = errorSAD( curPalette[ i ], pixel, 3 )
            bestEntry = i
        }
    }
    if( newEntry = = true ) {
        initColor( curPalette[ numCurEntry ], pixel )
        numCurEntry += 1
    }
    else {
        updateColor( curPalette[ bestEntry ], pixel )
    }
}
```
— 802

```
for( int i = 0; i < numCurEntry; i++ ) {
    minCost = a maximum value
    bestPred = -1
    for( int j = 0; j < numPredEntry; j++ ) {
        if( predCost( curPalette[ i ], predPalette[ j ] ) < minCost ) ) {
            minCost = predCost( curPalette[ i ], predPalette[ j ] )
            bestPred = j
        }
    }
    if( minCost < newCost( curPalette[ i ] ) ) {
        initColor( curPalette[ i ], predPalette[ bestPred ] )
    }
}
```
— 804

FIG. 8: Exemplary palette encoder algorithm for implementing steps 702 and 704 in FIG. 7

```
numCurEntry = 0
for( int i = 0; i < numPredEntry; i++ ) {
    curPalette[ numCurEntry ] = predPalette[ i ]
    numCurEntry += 1
}                                                        ← 902
for( each pixel including Y, U, V component ) {
    newEntry = true
    minCost = a maximum value
    bestEntry = -1
    for( int i = 0; i < numCurEntry; i++ ) {
        if( errorSAD( curPalette[ i ], pixel, 3 ) < qpTh && errorSAD( curPalette[ i ], pixel, 3 ) < minCost ) {
            newEntry = false
            minCost = errorSAD( curPalette[ i ], pixel, 3 )
            bestEntry = i
        }
    }
    if( newEntry == true ) {
        initColor( curPalette[ numCurEntry ], pixel )
        numCurEntry += 1
    }
    else {
        updateColor( curPalette[ bestEntry ], pixel )
    }
} for( int i = 0; i < numCurEntry; i++ ) {
    minCost = a maximum value
    bestPred = -1
    for( int j = 0; j < numPredEntry; j++ ) {
        if( predCost( curPalette[ i ], predPalette[ j ] ) < minCost ) ) {
            minCost = predCost( curPalette[ i ], predPalette[ j ] )
            bestPred = j
        }
    }
    if( minCost < newCost( curPalette[ i ] ) ) {
        initColor( curPalette[ i ], predPalette[ bestPred ] )
    }
}
```

FIG. 9: Exemplary algorithm for classifying pixels into palette entries

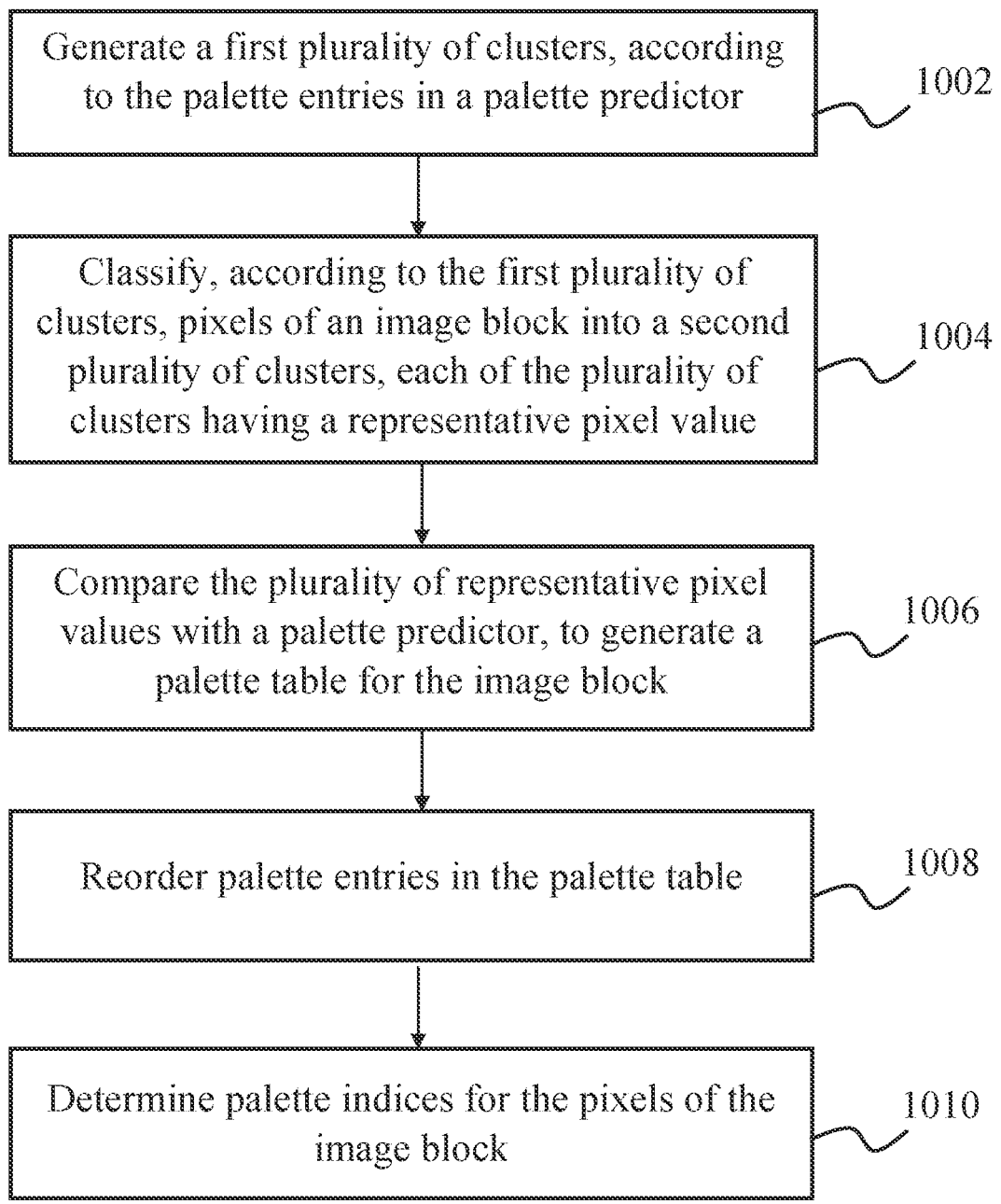
FIG. 10: Exemplary process for generating palette table for an image block

```
numCurEntry = 0
for( int iteration = 0; iteration < maxIteration; iteration++ ) {
    for( each pixel including Y, U, V component ) {
        newEntry = true
        minCost = a maximum value
        bestEntry = -1
        for( int i = 0; i < numCurEntry; i++ ) {
            if( errorSAD( curPalette[ i ], pixel, 3 ) < qpTh && errorSAD( curPalette[ i ], pixel, 3 ) < minCost ) {
                newEntry = false
                minCost = errorSAD( curPalette[ i ], pixel, 3 )
                bestEntry = i
            }
        }
        if( newEntry = = true ) {
            initColor( curPalette[ numCurEntry ], pixel )
            numCurEntry += 1
        }
        else {
            updateColor( curPalette[ bestEntry ], pixel )
        }
    } for( int i = 0; i < numCurEntry; i++ ) {
        minCost = a maximum value
        bestPred = -1
        for( int j = 0; j < numPredEntry; j++ ) {
            if( predCost( curPalette[ i ], predPalette[ j ] ) < minCost ) ) {
                minCost = predCost( curPalette[ i ], predPalette[ j ] )
                bestPred = j
            }
        }
        if( minCost < newCost( curPalette[ i ] ) ) ) {
            initColor( curPalette[ i ], predPalette[ bestPred ] )
        }
    }
}
```

FIG. 11: Exemplary algorithm for classifying pixels into palette entries

```
numCurEntry = 0
for( int i = 0; i < numPredEntry; i++ ) {
    curPalette[ numCurEntry ] = predPalette[ i ]
    numCurEntry += 1
}
for( int iteration = 0; iteration < maxIteration; iteration++ ) {
    for( each pixel including Y, U, V component ) {
        newEntry = true
        minCost = a maximum value
        bestEntry = -1
        for( int i = 0; i < numCurEntry; i++ ) {
            if( errorSAD( curPalette[ i ], pixel, 3 ) < qpTh && errorSAD( curPalette[ i ], pixel, 3 ) < minCost ) {
                newEntry = false
                minCost = errorSAD( curPalette[ i ], pixel, 3 )
                bestEntry = i
            }
        }
        if( newEntry == true ) {
            initColor( curPalette[ numCurEntry ], pixel )
            numCurEntry += 1
        }
        else {
            updateColor( curPalette[ bestEntry ], pixel )
        }
    } for( int i = 0; i < numCurEntry; i++ ) {
        minCost = a maximum value
        bestPred = -1
        for( int j = 0; j < numPredEntry; j++ ) {
            if( predCost( curPalette[ i ], predPalette[ j ] ) < minCost ) {
                minCost = predCost( curPalette[ i ], predPalette[ j ] )
                bestPred = j
            }
        }
        if( minCost < newCost( curPalette[ i ] ) ) {
            initColor( curPalette[ i ], predPalette[ bestPred ] )
        }
    }
}
```

FIG. 12: Exemplary algorithm for classifying pixels into palette entries

```
numCurEntry = 0
bestIter = -1
bestIterCost = a maximum value
for( int iteration = 0; iteration < maxIteration; iteration++ ) {
    for( each pixel including Y, U, V component ) {
        newEntry = true
        minCost = a maximum value
        bestEntry = -1
        for( int i = 0; i < numCurEntry; i++ ) {
            if( errorSAD( curPalette[ i ], pixel, 3 ) < qpTh && errorSAD( curPalette[ i ], pixel, 3 ) < minCost) {
                newEntry = false
                minCost = errorSAD( curPalette[ i ], pixel, 3 )
                bestEntry = i
            }
        }
        if( newEntry = = true ) {
            initColor( curPalette[ numCurEntry ], pixel )
            numCurEntry += 1
        }
        else {
            updateColor( curPalette[ bestEntry ], pixel )
        }
    } tmpIterCost = 0
    for( int i = 0; i < numCurEntry; i++ ) {
        minCost = a maximum value
        bestPred = -1
        for( int j = 0; j < numPredEntry; j++ ) {
            if( predCost( curPalette[ i ], predPalette[ j ] ) < minCost ) ) {
                minCost = predCost( curPalette[ i ], predPalette[ j ] )
                bestPred = j
            }
        }
        if( minCost < newCost( curPalette[ i ] ) ) {
            initColor( curPalette[ i ], predPalette[ bestPred ] )
        }
        tmpIterCost += minCost
    }
    if( tmpIterCost < bestIterCost ) {
        bestIterCost = tmpIterCost
        bestIter = iteration
    }
}
```

FIG. 13: Exemplary algorithm for classifying pixels into palette entries

```
fi
    qpTh[] specifies an array of threshold for a given QP numCurEntry = 0
    bestIter = -1
    bestIterCost = a maximum value
    for( int iteration = 0; iteration < maxIteration; iteration++ ) {
        for( each pixel including Y, U, V component ) {
            newEntry = true
            minCost = a maximum value
            bestEntry = -1
            for( int i = 0; i < numCurEntry; i++ ) {
                if( errorSAD( curPalette[ i ], pixel, 3 ) < qpTh[ iteration ] && errorSAD( curPalette[ i ], pixel, 3 ) < minCost ) {
                    newEntry = false
                    minCost = errorSAD( curPalette[ i ], pixel, 3 )
                    bestEntry = i
                }
            }
            if( newEntry = = true ) {
                initColor( curPalette[ numCurEntry ], pixel )
                numCurEntry += 1
            }
            else {
                updateColor( curPalette[ bestEntry ], pixel )
            }
        } tmpIterCost = 0
        for( int i = 0; i < numCurEntry; i++ ) {
            minCost = a maximum value
            bestPred = -1
            for( int j = 0; j < numPredEntry; j++ ) {
                if( predCost( curPalette[ i ], predPalette[ j ] ) < minCost ) ) {
                    minCost = predCost( curPalette[ i ], predPalette[ j ] )
                    bestPred = j
                }
            }
            if( minCost < newCost( curPalette[ i ] ) ) {
                initColor( curPalette[ i ], predPalette[ bestPred ] )
            }
            tmpIterCost += minCost
        }
        if( tmpIterCost < bestIterCost ) {
            bestIterCost = tmpIterCost
            bestIter = iteration
        }
    }
```

FIG. 14: Exemplary algorithm for classifying pixels into palette entries

```
numCurEntry = 0
for( pixel contains Y, U, V components ) {                        1502
    newEntry = true
    minCost = a maximum value
    bestEntry = -1
    for( int i = 0; i < numCurEntry; i++ ) {
        if( errorSAD( curPalette[ i ], pixel, 3 ) < qpTh && errorSAD( curPalette[ i ], pixel, 3 ) < minCost ) {
            newEntry = false
            minCost = errorSAD( curPalette[ i ], pixel, 3 )
            bestEntry = i
        }
    }
    if( newEntry = = true ) {
        initColor( curPalette[ numCurEntry ], pixel )
        numCurEntry += 1
    }
    else {
        updateColor( curPalette[ bestEntry ], pixel )
    }
}
                                                                  1504
for( pixel only contains Y component ) {
    newEntry = true
    minCost = a maximum value
    bestEntry = -1
    for( int i = 0; i < numCurEntry; i++ ) {
        if( errorSAD( curPalette[ i ], pixel, 1 ) < qpTh && errorSAD( curPalette[ i ], pixel, 1 ) < minCost ) {
            newEntry = false
            minCost = errorSAD( curPalette[ i ], pixel, 1 )
            bestEntry = i
        }
    }
    if( newEntry = = true ) {
        initColor( curPalette[ numCurEntry ], pixel )
        numCurEntry += 1
    }
    else {
        updateColor( curPalette[ bestEntry ], pixel )
    }
} for( int i = 0; i < numCurEntry; i++ ) {
    minCost = a maximum value
    bestPred = -1
    for( int j = 0; j < numPredEntry; j++ ) {
        if( predCost( curPalette[ i ], predPalette[ j ] ) < minCost ) ) {
            minCost = predCost( curPalette[ i ], predPalette[ j ] )
            bestPred = j
        }
    }
    if( minCost < newCost( curPalette[ i ] ) ) {
        initColor( curPalette[ i ], predPalette[ bestPred ] )
    }
}
```

FIG. 15: Exemplary algorithm for classifying pixels into palette entries

```
numCurEntry = 0
for( each pixel ) {
    newEntry = true
    minCost = a maximum value
    bestEntry = -1
    numComp = 3
    if( pixel only contains luma component )
        numComp = 1
    for( int i = 0; i < numCurEntry; i++ ) {
        if( errorSAD( curPalette[ i ], pixel, numComp ) < qpTh && errorSAD( curPalette[ i ], pixel, numComp ) < minCost ) {
            newEntry = false
            minCost = errorSAD( curPalette[ i ], pixel, numComp )
            bestEntry = i
        }
    }
    if( newEntry = = true ) {
        initColor( curPalette[ numCurEntry ], pixel )
        numCurEntry += 1
    }
    else {
        updateColor( curPalette[ bestEntry ], pixel )
    }
} for( int i = 0; i < numCurEntry; i++ ) {
    minCost = a maximum value
    bestPred = -1
    for( int j = 0; j < numPredEntry; j++  ) {
        if( predCost( curPalette[ i ], predPalette[ j ] ) < minCost ) ) {
            minCost = predCost( curPalette[ i ], predPalette[ j ] )
            bestPred = j
        }
    }
    if( minCost < newCost( curPalette[ i ] ) ) {
        initColor( curPalette[ i ], predPalette[ bestPred ] )
    }
}
```

FIG. 16: Exemplary algorithm for classifying pixels into palette entries

METHODS FOR CODING VIDEO DATA IN PALETTE MODE

CROSS-REFERENCE TO RELATED APPLICATIONS

The disclosure claims the benefits of priority to U.S. Provisional Application No. 62/953,582, filed Dec. 26, 2019, which is incorporated herein by reference in its entirety.

TECHNICAL FIELD

The present disclosure generally relates to video processing, and more particularly, to methods and apparatuses for coding video data in a palette mode.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for coding video data in a palette mode. In some exemplary embodiments, the method includes: classifying pixels of a coding unit into a first plurality of clusters; and determining, according to the first plurality of clusters, a palette table for the coding unit.

Embodiments of the present disclosure provide an apparatus for coding video data in a palette mode. The apparatus can include a memory storing a set of instructions, and a processor coupled to the memory. The processor is configured to execute the set of instructions to cause the apparatus to perform: classifying pixels of a coding unit into a first plurality of clusters; and determining, according to the first plurality of clusters, a palette table for the coding unit.

Embodiments of the present disclosure provide a non-transitory computer-readable storage medium storing a set of instructions that are executable by one or more processors of a device to cause the device to perform a method for coding video data in a palette mode. The method includes: classifying pixels of a coding unit into a first plurality of clusters; and determining, according to the first plurality of clusters, a palette table for the coding unit.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 is a flow chart of a method for coding an image block in a palette mode, consistent with some embodiments of the disclosure.

FIG. 8 illustrates an exemplary encoder algorithm for implementing the method in FIG. 7, consistent with some embodiments of the disclosure.

FIG. 9 shows an exemplary encoder algorithm for initializing the palette table using the palette predictor, consistent with some embodiments of the disclosure.

FIG. 10 is a flow chart of a method for coding an image block in a palette mode, consistent with some embodiments of the disclosure.

FIG. 11 shows an exemplary encoder algorithm for classifying pixels of an image block into a plurality of palette entries, consistent with some embodiments of the disclosure.

FIG. 12 shows another exemplary encoder algorithm for classifying pixels of an image block into a plurality of palette entries, consistent with some embodiments of the disclosure.

FIG. 13 shows another exemplary encoder algorithm for classifying pixels of an image block into a plurality of palette entries, consistent with some embodiments of the disclosure.

FIG. 14 shows another exemplary encoder algorithm for classifying pixels of an image block into a plurality of palette entries, consistent with some embodiments of the disclosure.

FIG. 15 shows another exemplary encoder algorithm for classifying pixels of an image block into a plurality of palette entries, consistent with some embodiments of the disclosure.

FIG. 16 shows another exemplary encoder algorithm for classifying pixels of an image block into a plurality of palette entries, consistent with some embodiments of the disclosure.

DETAILED DESCRIPTION

Figure 1:
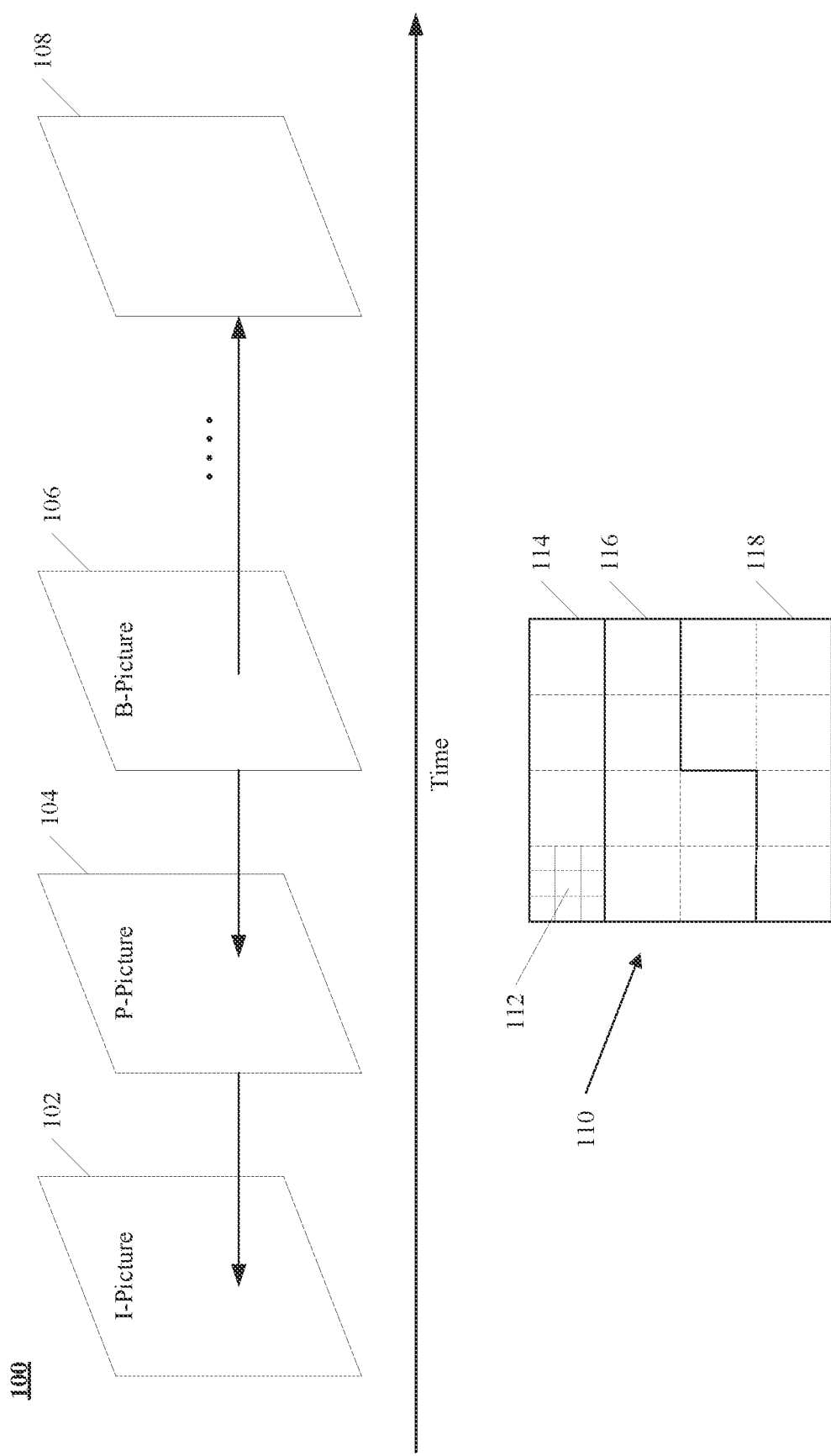
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64-64, 32-32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266NVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266NVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
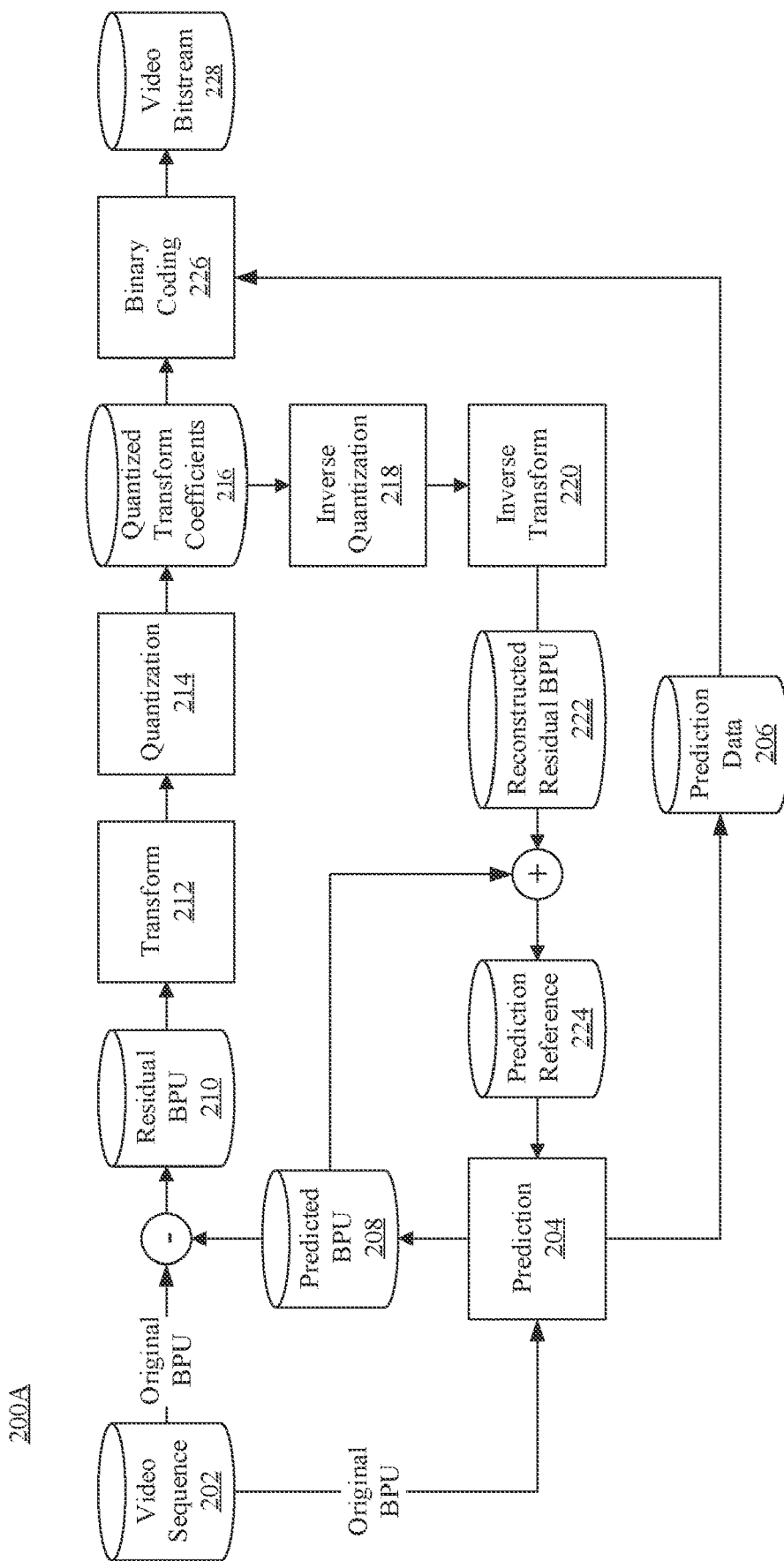
FIG. 2A is a schematic diagram illustrating an exemplary encoding process of a hybrid video coding system, consistent with embodiments of the disclosure.
Figure 2B:
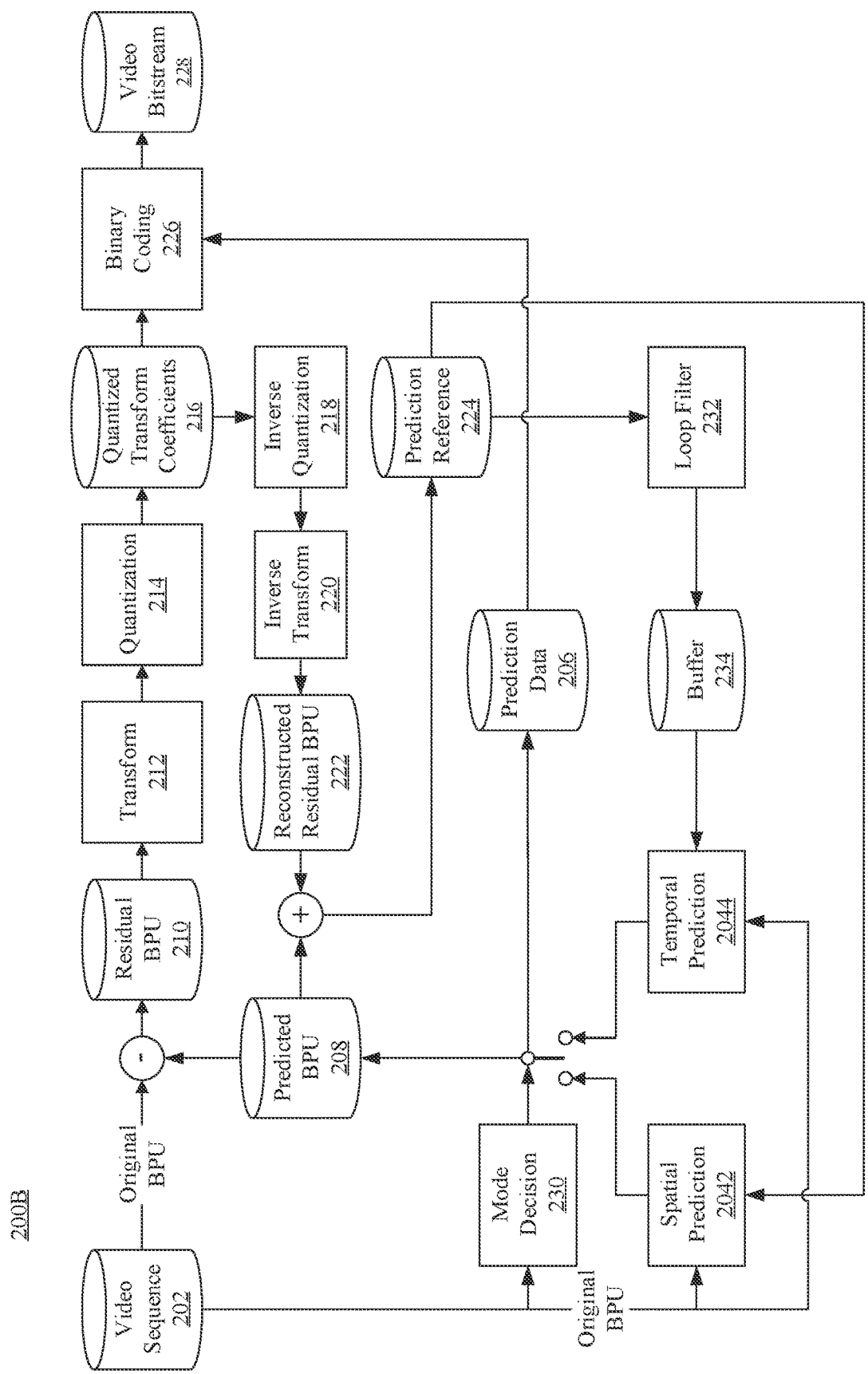
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266NVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266NVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
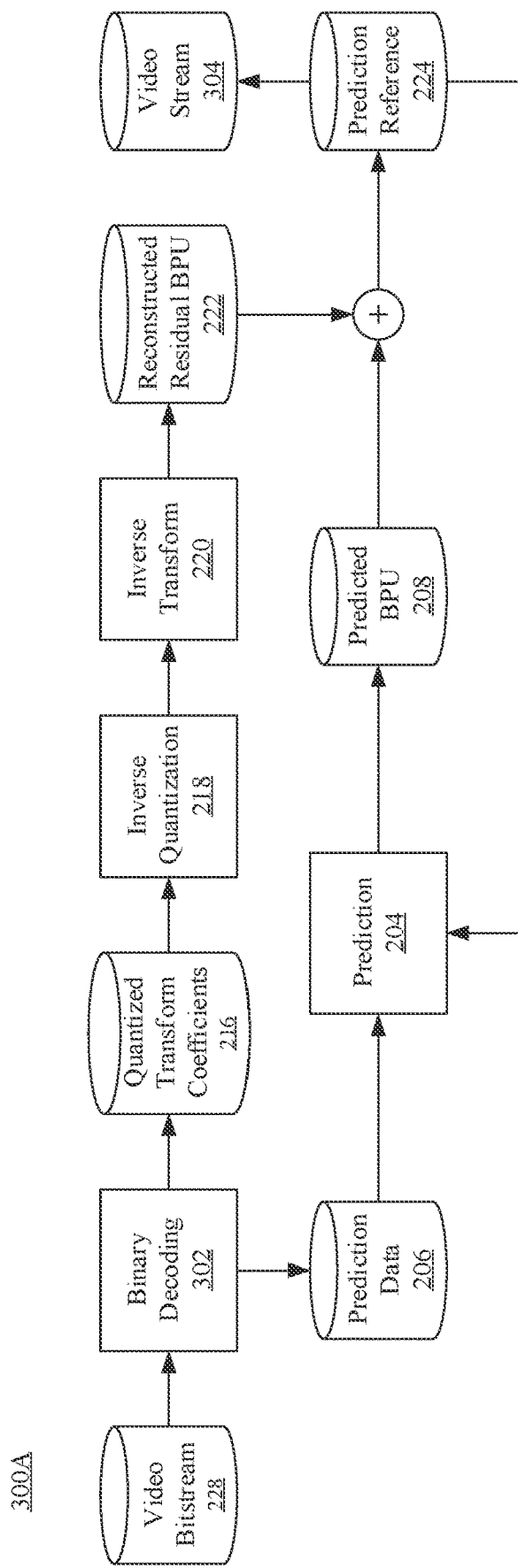
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
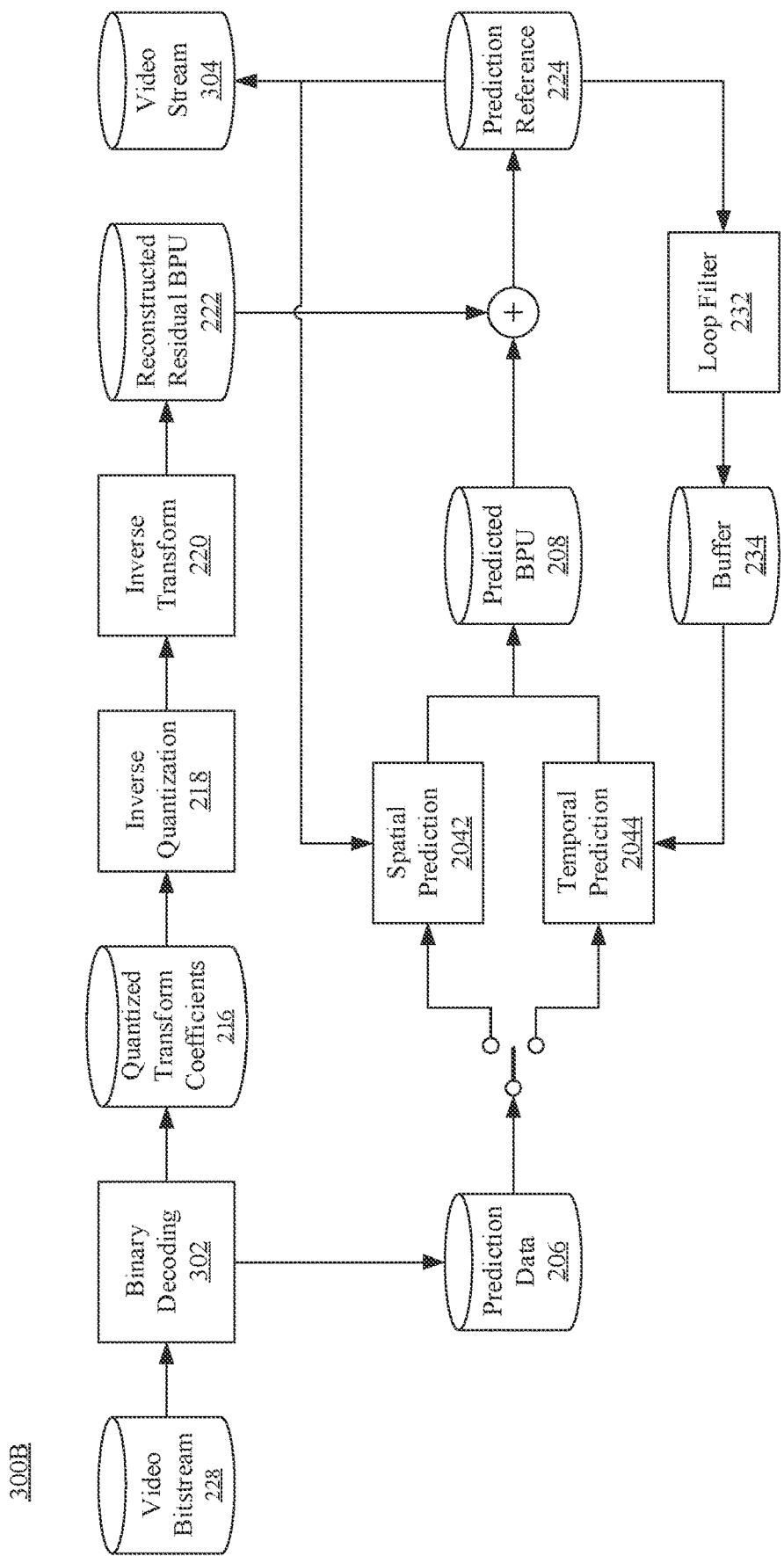
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
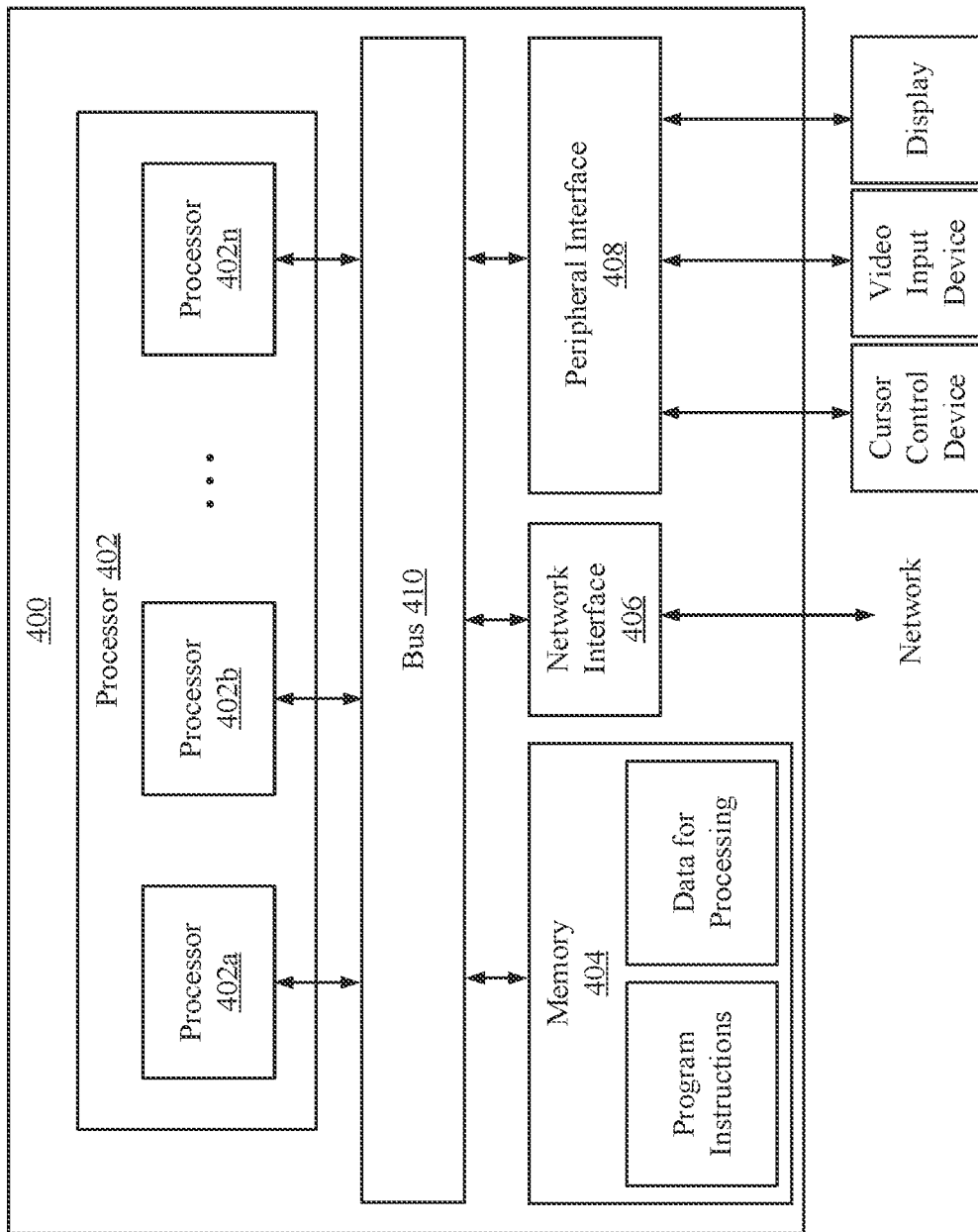
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice may be signaled at the high level, for example, using init_qp_minus26 syntax element in the Picture Parameter Set (PPS) and using slice_qp_delta syntax element in the slice header. Further, the QP values may be adapted at the local level for each CU using delta QP values sent at the granularity of quantization groups.

In VVC, a palette mode can be used in 4:4:4 color format. When the palette mode is enabled, a flag is transmitted at the CU level if the CU size is smaller than or equal to 64-64 indicating whether the palette mode is used.

Figure 5:
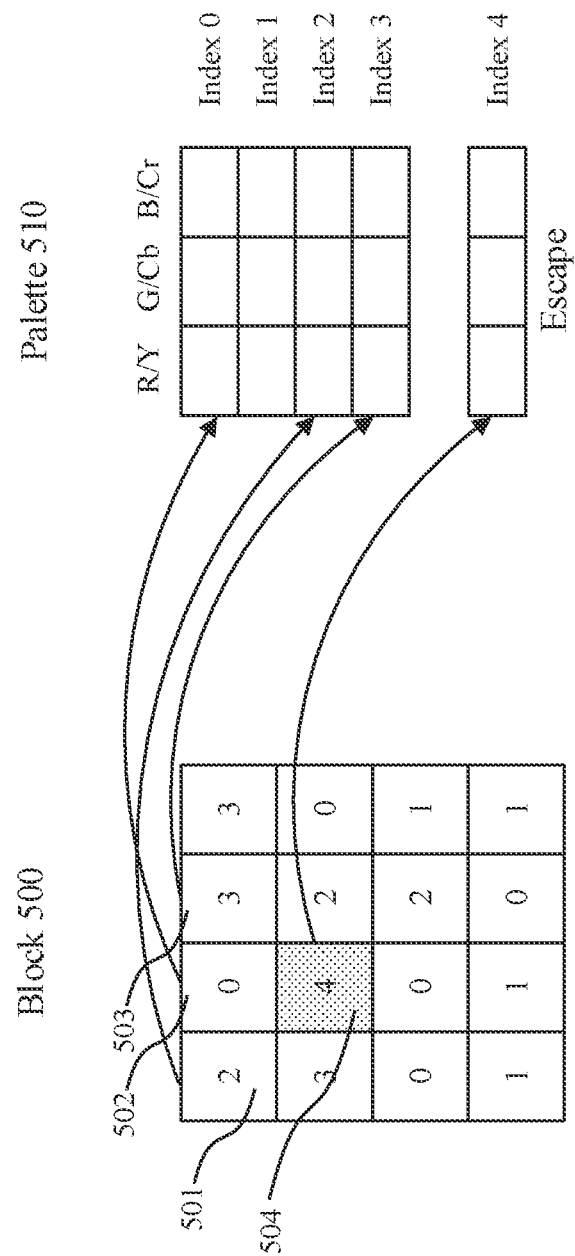
FIG. 5 illustrates an image block coded in a palette mode, consistent with some embodiments of the disclosure.

FIG. 5 illustrates a schematic diagram of an exemplary block 500 coded in palette mode, according to some embodiments of the present disclosure. As shown in FIG. 5, if the palette mode is utilized to code the current CU (e.g., block 500), the sample values in each position (e.g., position 501, position 502, position 503, or position 504) in the CU are represented by a small set of representative color values. The set is referred to as a "palette" or "palette table" (e.g., palette 510). For sample positions with values close to the palette colors, the corresponding palette indices (e.g., index 0, index 1, index 2, or index 3) are signaled. According to some disclosed embodiments, a color value that is outside the palette table can be specified by signaling an escape index (e.g., index 4). Then, for all positions in the CU that uses the escape color index, the (quantized) color component values are signaled for each of these positions.

Figure 6:
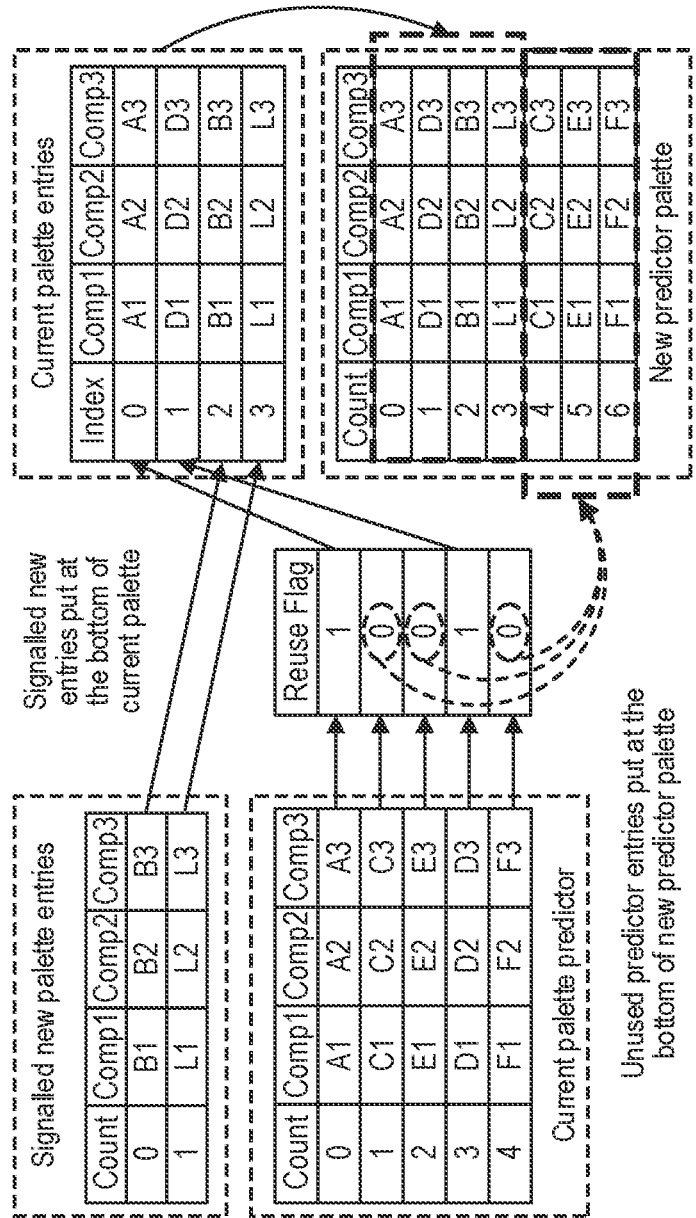
FIG. 6 illustrates a process for updating a palette predictor after encoding a coding unit, consistent with some embodiments of the disclosure.

For coding the palette table, a predictor palette is maintained. The predictor palette is initialized to 0 (e.g., empty) at the beginning of each slice for non-wavefront case and at the beginning of each CTU row for wavefront case. FIG. 6 illustrates a schematic diagram of an exemplary process 600 for updating predictor palette after encoding a coding unit, according to some embodiments of the present disclosure.

As shown in FIG. 6, for each entry in the predictor palette, a reuse flag is signaled to indicate whether it will be included in the current palette table of the current CU. The reuse flags are sent using run-length coding of zeros, after which the number of new palette entries and the component values for the new palette entries are signaled. After encoding the palette coded CU, the predictor palette is updated using the current palette table, and entries from the previous predictor palette that are not reused in the current palette table are added at the end of the new predictor palette until the maximum size allowed is reached.

In some embodiments, an escape flag is signaled for each CU to indicate if escape symbols are present in the current CU. If escape symbols are present, the palette table is augmented by one and the last index is assigned to be the escape symbol (e.g., index 4 as shown in FIG. 5).

Referring to FIG. 5, palette indices of samples in a CU form a palette index map. The index map is coded using horizontal or vertical traverse scans. The scan order is explicitly signaled in the bitstream using the syntax element "palette_transpose_flag." The palette index map is coded using the index-run mode or the index-copy mode.

FIG. 7 is a flow chart of method 700 for coding an image block in the palette mode, consistent with the disclosed embodiments. Method 700 can be performed by an encoder (e.g., by process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 700. In some embodiments, method 700 can be implemented by a computer program product, embodied in a computer-readable medium, including computer-executable instructions, such as program code, executed by computers (e.g., apparatus 400 of FIG. 4). Referring to FIG. 7, method 700 may include the following steps 702-708.

At step 702, the pixels in an image block are classified into a plurality of clusters, according to the values of the pixels. Consistent with the disclosed embodiments, the value of a pixel has three components: a luma component (Y component), and two chroma components (Cr and Cb components). A representative pixel value (e.g., palette entry) can be determined for each of the plurality of clusters. FIG. 8 shows an exemplary encoder algorithm for implementing steps 702 and 704 shown in FIG. 7, according to some disclosed embodiments. As shown in FIG. 8, module 802 can be used to implement step 702. Specifically, pixels in an image block are divided into several clusters (e.g., palette entries) according to the values of the pixels. A quantization parameter (QP) dependent threshold is used to define whether two pixels should be classified into the same cluster. When the difference (e.g., sum of absolute difference) between each component (e.g., Y, Cb, Cr components) of two pixels is smaller than the QP dependent threshold, the two pixels are classified into the same cluster. Otherwise, the two pixels are classified into two separate clusters.

Referring back to FIG. 7, at step 704, the plurality of representative pixel values (determined at step 702) are compared to a palette predictor of the image block, to generate a palette table for the image block. As shown in FIG. 8, module 804 can be used to implement step 704. Specifically, for each representative pixel value, two costs are calculated-a first cost for signaling the representative pixel value as a new palette entry, and a second cost for predicting the representative pixel value from a corresponding palette entry in the palette predictor. These two costs are compared with each other. If the first cost is smaller than the second cost, the representative pixel value is added to the palette table of the image block. If the second cost is smaller or equal to the first block, the corresponding palette entry in the palette predictor is added to the palette table of the image block.

Referring back to FIG. 7, at step 706, the plurality of palette entries in the palette table are reordered. Specifically, the reused palette entries from the palette predictor are put in the front of the palette table, followed by the palette entries that are newly determined and not from the palette predictor.

At step 708, a palette index for each pixel of the image block is determined according to the palette table. Specifically, each pixel in the image block can be mapped to a palette entry in the palette table, and each palette entry in the palette table has a palette index. Accordingly, each pixel in the image block can be mapped to a palette index that points to the corresponding palette entry.

According to some embodiments, the palette mode is allowed only for the 4:4:4 color format. For example, in the VVC7 reference software (VTM7), the encoder algorithm is customized for 4:4:4 color format. This means that the encoder algorithm may not be suitable for non 4:4:4 color formats, such as monochrome, 4:2:0, 4:2:2, etc.

Moreover, the above-described palette coding algorithm have some issues that may decrease the coding efficiency of the palette mode. In particular, as described above in connection with FIGS. 7 and 8, to generate a palette table for an image block, method 700 classifies the pixels in an image block into several clusters, and then compares the representative pixel value of each cluster to the palette predictor. The palette table starts with an empty table regardless of whether the representative pixel values are already in the palette predictor or not. Thus, the information of the palette predictor is not used in the classification of the pixels in the image block (i.e., step 702) and is wasted.

Moreover, in some embodiments, the classification of the pixels in the image block is only performed once, and thus the classification results may not be optimal.

Moreover, in the classification of pixels (step 702), both the luma and chroma components of a pixel is relied upon to perform the classification. However, for non 4:4:4 color formats, such as 4:2:0 or 4:2:2, pixels at certain positions may not contain chroma components. Hence, the classification algorithm needs to be modified accordingly for non 4:4:4 color formats.

Moreover, after the palette indices of the pixels in the image block are determined in step 708 (FIG. 7), there may be some palette entries (and the associated palette entries) that have not been mapped to any pixel. However, these redundant palette indices are still signaled in the bitstream, which reduces the signaling efficiency.

The present disclosure provides methods to solve the above problems and improve palette coding efficiency. Some embodiments with the disclosed methods are described below in detail.

According to some embodiments, the palette predictor is used as starting point for pixels classification. The palette table is first initialized using the palette predictor, and then the pixels classification is performed in the same way as in step 702 (FIGS. 7 and 8). FIG. 9 shows an exemplary encoder algorithm for initializing the palette table using the palette predictor, according to the present embodiments. In FIG. 9, the syntax elements different from the algorithm in FIG. 8 are shown in a dashed box 902.

FIG. 10 shows a method 1000 consistent with the embodiment of FIG. 9. Method 1000 can be performed by an encoder (e.g., by process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 1000. In some embodiments, method 1000 can be implemented by a computer program product, embodied in a computer-readable medium, including computer-executable instructions, such as program code, executed by computers (e.g., apparatus 400 of FIG. 4). Referring to FIG. 10, method 1000 includes the following steps 1002-1010.

At step 1002, the palette entries in a palette predictor are used to generate a first plurality of clusters. Each palette entry corresponds to a cluster.

At step 1004, the pixels in the image block are classified into a second plurality of clusters, according to the first plurality of clusters. Specifically, for each pixel in the image block, if the distance of its pixel value to one of the existing clusters is smaller than a preset threshold, the pixel is classified to the existing cluster. If, however, the pixel value does not belong to any existing cluster, the pixel value and all the existing clusters are reclassified to generate a new set of clusters. This way, all the pixels in the image block can be classified into a second plurality of clusters. Each of the second plurality of clusters has a representative pixel value.

Steps 1006, 1008, and 1010 are similar to steps 704, 706, and 708, respectively.

According to some embodiments, more than one iteration of classification (e.g. color clustering) are performed. The results of a current iteration of classification may be used as the starting point of the next iteration of classification. FIG. 11 shows an exemplary encoder algorithm for iteratively performing the classification of pixels, according to the present embodiments. In FIG. 11, the syntax elements different from the algorithm in FIG. 8 are shown in dashed boxes. Although not shown in FIG. 11, it is contemplated that in some embodiments early termination may be applied. For example, between the n-th and (n+1)-th iteration, the distance between the old and new centroids of each clusters may be checked. If the distances do not change or the change is below or equal to a preset threshold, that means the centroids and the corresponding clusters have stabilized. Therefore, the iterating loop in FIG. 11 may be terminated early.

It is also contemplated that the algorithms in FIGS. 9 and 11 can be combined. According to some embodiments, the palette predictor is used as the starting point for the first iteration of classification. Then, the results of the first iteration of classification is used as the starting point for the second iteration of classification. FIG. 12 shows an exemplary encoder algorithm for performing a classification method that combines the features shown in FIGS. 9 and 11. In FIG. 12, the syntax elements different from the algorithm in FIG. 8 are shown in dashed boxes. Similarly, though not shown in FIG. 12, early termination of the iteration may be applied.

According to some embodiments, when performing multiple iterations of classification, a cost for the classification results may be calculated and used to determine the resulting palette. In particular, during performing the classification (e.g., clustering) of the pixels, although initially the cost may go down in the earlier iterations, as more iterations are performed, the clusters may become less effective and thus the cost-vs-iteration may start to go up. The proposed method for using the cost for the classification results is shown in FIG. 13. The encoder can find the iteration with the minimum cost and use the classification results with the minimum cost to perform the remaining steps of the palette coding. In FIG. 13, the syntax elements different from the algorithm in FIG. 8 are shown in dashed boxes.

According to some embodiments, when performing multiple iterations of classification, different thresholds (e.g., QP dependent thresholds) can be used in each iteration to check whether two pixels classified to the same category (e.g., palette entry) should be reclassified into different categories. FIG. 14 shows an exemplary encoder algorithm for using the threshold. The threshold can be viewed as a balance between bits and distortion. When the threshold is small, the pixels may be classified into more categories. In this case, the overall distortion for a block is small but the number of bits for signaling all the representative colors for each category is high. On the other hand, when the threshold is increased, the overall distortion is increased but the number of bits is decreased. Therefore, the classification results obtained from using different thresholds can be analyzed to determine the trade-off between bits and distortions and find an optimal bits-distortion balance that can improve the coding performance.

According to some embodiments, for non 4:4:4 color formats, the classification of pixels may be performed differently depending on whether the pixels contain one or both of the luma and chroma components. FIG. 15 shows an exemplary encoder algorithm for performing the classification of pixels in two steps (syntax elements different from the algorithm in FIG. 8 are shown in dashed boxes). As shown by the dashed box 1502 in FIG. 15, in a first step, only the pixels containing both luma and chroma components are classified, during which both the luma and chroma components are used to calculate the difference between two pixels. Then, as shown by the dashed box 1504, in a second step, the pixels containing only luma components are classified, during which only the luma component is used to calculate the difference between two pixels.

FIG. 16 shows another exemplary encoder algorithm for performing the classification differently depending on whether the pixels contain one or both of the luma and chroma components (syntax elements different from the algorithm in FIG. 8 are shown in dashed boxes). As shown in FIG. 16, the classification process is not divided into two steps. Rather, the encoder examines each pixel to determine whether the pixel contains both the luma and chroma components and classifies the pixel by using the available components. If the pixel contains both luma and chroma components ("numComp=3" syntax in FIG. 16, referring to pixels having Y, Cb, Cr components), the encoder uses both the luma and chroma components to classify the pixel. If the pixel contains only luma components ("numComp=1" syntax in FIG. 16, referring to pixels only having the Y component), the encoder only uses the luma components to classify the pixel.

According to some embodiments, to remove the redundancy in palette, an additional process is performed after the palette indices of the pixels in the image block are determined (step 708 in FIG. 7), to check whether any palette entry in the palette table is not mapped to a pixel in the image block. If a palette entry is not mapped to any pixel in the image block, it is removed from the palette table of the current image block. This way, the unused palette entry and its associated palette index are not signaled in the bitstream, and thus the coding efficiency is improved.

According to some embodiments, after generating the palette table, a high precision rate-distortion (RD) cost function is used to find the best palette entry index value of a pixel position. In these embodiments, the RD cost function to find the best index is defined as follows:

$$Rdcost = distortion * (1 << 15) + lambda * Rate \qquad \text{Equation (1)}$$

where the "distortion" is the sub-of-absolute difference between original colors and palette colors, and the "Rate" is the number of bits required to code the index value and computed as follows:

$$Rate = RateContext + (RateBypass << 15) \qquad \text{Equation (2)}$$

In Equation (2), the "Rate" has two parts-context coding part ("RateContext") and by-pass coding part ("RateBypass"). The RateContext is the estimated bits required to signal run_copy_flag and copy_above_palette_indices_flag. RateBypass is the number of coding bits required to signal palette_idx_idc. The detailed description of run_copy_flag, copy_above_palette_indices_flag and palette_idx_idc can be found in the VVC7 specification, which is incorporated herein by its entirety.

It is contemplated that one or more of the embodiments in the present disclosure can be combined to perform the palette coding.

The embodiments may further be described using the following clauses:

1. A palette coding method, comprising:
determining a first plurality of clusters according to palette entries in a palette predictor;
classifying, according to the first plurality of clusters, pixels of a coding block into a second plurality of clusters; and
determining, according to the second plurality of clusters, a palette table for the coding unit.

2. The method of clause 1, wherein classifying, according to the first plurality of clusters, the pixels of the coding block into the second plurality of clusters comprises:
performing the classifying in a plurality of iterations, wherein the plurality of iterations are terminated when a change caused by the iterations to the second plurality of clusters is below a preset threshold.

3. The method of clause 2, further comprising:
determining, from the plurality of iterations, a first iteration at which a cost associated with the classifying reaches a minimum value; and determining, according to classification results of the first iteration, palette entries in the palette table.

4. The method of any one of clauses 2 and 3, wherein each of the plurality of iterations is performed using a different quantization parameter (QP) threshold.

5. The method of any one of clauses 1-4, wherein classifying, according to the first plurality of clusters, the pixels of the coding block into the second plurality of clusters comprises:
dividing the pixels of the coding block into a first group of pixels and a second group of pixels;
classifying the first group of pixels according to both luma and chroma components of the first group of pixels; and
classifying the second group of pixels according to only luma components of the second group of pixels.

6. The method of any one of clauses 1-4, wherein classifying, according to the first plurality of clusters, the pixels of the coding block into the second plurality of clusters comprises:
determining whether a first pixel of the coding block has chroma components; and
in response to the first pixel having chroma components, classifying the first pixel according to both luma and chroma components of the first pixel, or
in response to the first pixel having no chroma components, classifying the first pixel according to a luma component of the first pixel.

7. The method of any one of clauses 5 and 6, wherein the coding block has a 4:2:2 or 4:2:0 color format.

8. The method of any one of clauses 1-7, further comprising:

mapping the pixels of the coding block to palette entries in the palette table;

determining, in the palette table, a first palette entry to which no pixel of the coding block is mapped; and removing the first palette entry from the palette table.

9. The method of any one of clauses 1-8, further comprising:

determining a palette index for a pixel in the coding block, by using a rate-distortion (RD) cost function.

10. An apparatus for processing video content, comprising:

a memory storing a set of instructions; and a processor coupled to the memory and configured to execute the set of instructions to cause the apparatus to perform:

determining a first plurality of clusters according to palette entries in a palette predictor;

classifying, according to the first plurality of clusters, pixels of a coding block into a second plurality of clusters; and determining, according to the second plurality of clusters, a palette table for the coding unit.

11. The apparatus of clause 10, wherein the processor is configured to execute the set of instructions to cause the apparatus to further perform:

performing the classifying in a plurality of iterations, wherein the plurality of iterations are terminated when a change caused by the iterations to the second plurality of clusters is below a preset threshold.

12. The apparatus of clause 11, wherein the processor is configured to execute the set of instructions to cause the apparatus to further perform:

determining, from the plurality of iterations, a first iteration at which a cost associated with the classifying reaches a minimum value; and determining, according to classification results of the first iteration, palette entries in the palette table.

13. The apparatus of any one of clauses 11 and 12, wherein each of the plurality of iterations is performed using a different quantization parameter (QP) threshold.

14. The apparatus of any one of clauses 10-13, wherein in classifying, according to the first plurality of clusters, the pixels of the coding block into the second plurality of clusters, the processor is configured to execute the set of instructions to cause the apparatus to further perform:

dividing the pixels of the coding block into a first group of pixels and a second group of pixels;

classifying the first group of pixels according to both luma and chroma components of the first group of pixels; and classifying the second group of pixels according to only luma components of the second group of pixels.

15. The apparatus of any one of clauses 10-13, wherein in classifying, according to the first plurality of clusters, the pixels of the coding block into the second plurality of clusters, the processor is configured to execute the set of instructions to cause the apparatus to further perform:

determining whether a first pixel of the coding block has chroma components; and in response to the first pixel having chroma components, classifying the first pixel according to both luma and chroma components of the first pixel, or in response to the first pixel having no chroma components, classifying the first pixel according to a luma component of the first pixel.

16. The apparatus of any one of clauses 14 and 15, wherein the coding block has a 4:2:2 or 4:2:0 color format.

17. The apparatus of any one of clauses 10-16, wherein the processor is configured to execute the set of instructions to cause the apparatus to further perform:

mapping the pixels of the coding block to palette entries in the palette table;

determining, in the palette table, a first palette entry to which no pixel of the coding block is mapped; and removing the first palette entry from the palette table.

18. The apparatus of any one of clauses 10-17, wherein the processor is configured to execute the set of instructions to cause the apparatus to further perform:

determining a palette index for a pixel in the coding block, by using a rate-distortion (RD) cost function.

19. A non-transitory computer-readable storage medium storing a set of instructions that are executable by one or more processors of a device to cause the device to perform a method for processing video content, the method comprising:

determining a first plurality of clusters according to palette entries in a palette predictor;

classifying, according to the first plurality of clusters, pixels of a coding block into a second plurality of clusters; and determining, according to the second plurality of clusters, a palette table for the coding unit.

20. The medium of clause 19, wherein classifying, according to the first plurality of clusters, the pixels of the coding block into the second plurality of clusters comprises:

performing the classifying in a plurality of iterations, wherein the plurality of iterations are terminated when a change caused by the iterations to the second plurality of clusters is below a preset threshold.

21. The medium of clause 20, wherein the set of instructions are executable by the one or more processors of the device to cause the device to further perform:

determining, from the plurality of iterations, a first iteration at which a cost associated with the classifying reaches a minimum value; and determining, according to classification results of the first iteration, palette entries in the palette table.

22. The medium of any one of clauses 20 and 21, wherein each of the plurality of iterations is performed using a different quantization parameter (QP) threshold.

23. The medium of any one of clauses 19-22, wherein classifying, according to the first plurality of clusters, the pixels of the coding block into the second plurality of clusters comprises:

dividing the pixels of the coding block into a first group of pixels and a second group of pixels;

classifying the first group of pixels according to both luma and chroma components of the first group of pixels; and classifying the second group of pixels according to only luma components of the second group of pixels.

24. The medium of any one of clauses 19-22, wherein classifying, according to the first plurality of clusters, the pixels of the coding block into the second plurality of clusters comprises:

determining whether a first pixel of the coding block has chroma components; and in response to the first pixel having chroma components, classifying the first pixel according to both luma and chroma components of the first pixel, or in response to the first pixel having no chroma components, classifying the first pixel according to a luma component of the first pixel.

25. The medium of any one of clauses 23 and 24, wherein the coding block has a 4:2:2 or 4:2:0 color format.

26. The medium of any one of clauses 19-25, wherein the set of instructions are executable by the one or more processors of the device to cause the device to further perform:
mapping the pixels of the coding block to palette entries in the palette table;
determining, in the palette table, a first palette entry to which no pixel of the coding block is mapped; and
removing the first palette entry from the palette table.

27. The medium of any one of clauses 19-26, wherein the set of instructions are executable by the one or more processors of the device to cause the device to further perform:
determining a palette index for a pixel in the coding block, by using a rate-distortion (RD) cost function.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A palette coding method, comprising:
classifying pixels of a coding unit into a first plurality of clusters; and
determining, according to the first plurality of clusters, a palette table for the coding unit,
wherein classifying the pixels of the coding unit into the first plurality of clusters comprises:
determining a second plurality of clusters, the second plurality of clusters corresponding to palette entries in a palette predictor of the coding unit, respectively; and
classifying, according to the second plurality of clusters, the pixels of the coding unit into the first plurality of clusters.

2. The method of claim 1, wherein classifying the pixels of the coding unit into the first plurality of clusters comprises:
performing the classifying in a plurality of iterations, wherein in a (N+1)-th iteration, the pixels of the coding unit are classified according to clusters classified in a N-th iteration, N being an integer.

3. The method of claim 2, wherein performing the classifying in the plurality of iterations comprises:
terminating the plurality of iterations when a change caused by the iterations to the first plurality of clusters is below a preset threshold.

4. The method of claim 2, further comprising:
determining, from the plurality of iterations, a first iteration at which a cost associated with the classifying reaches a minimum value; and
determining, according to classification results of the first iteration, palette entries in the palette table.

5. The method of claim 2, wherein each of the plurality of iterations is performed using a different quantization parameter (QP) threshold.

6. The method of claim 1, wherein classifying the pixels of the coding unit into the first plurality of clusters comprises:
dividing the pixels of the coding unit into a first group of pixels and a second group of pixels;
classifying the first group of pixels according to both luma and chroma components of the first group of pixels; and
classifying the second group of pixels according to only luma components of the second group of pixels.

7. The method of claim 6, wherein the coding unit has a 4:2:2 or 4:2:0 color format.

8. The method of claim 1, wherein classifying the pixels of the coding unit into the first plurality of clusters comprises:
- determining whether a first pixel of the coding unit has chroma components; and
- in response to the first pixel having chroma components, classifying the first pixel according to both luma and chroma components of the first pixel, or
- in response to the first pixel having no chroma components, classifying the first pixel according to a luma component of the first pixel.

9. The method of claim 8, wherein the coding unit has a 4:2:2 or 4:2:0 color format.

10. The method of claim 1, further comprising:
- mapping the pixels of the coding unit to palette entries in the palette table;
- determining, in the palette table, a first palette entry to which no pixel of the coding unit is mapped; and
- removing the first palette entry from the palette table.

11. The method of claim 1, further comprising:
- determining a palette index for a pixel in the coding unit, by using a rate-distortion (RD) cost function.

12. An apparatus for processing video content, comprising:
- a memory storing a set of instructions; and
- a processor coupled to the memory and configured to execute the set of instructions to cause the apparatus to perform:
  - classifying pixels of a coding unit into a first plurality of clusters; and
  - determining, according to the first plurality of clusters, a palette table for the coding unit,
  - wherein classifying the pixels of the coding unit into the first plurality of clusters comprises:
    - determining a second plurality of clusters, the second plurality of clusters corresponding to palette entries in a palette predictor of the coding unit, respectively; and
    - classifying, according to the second plurality of clusters, the pixels of the coding unit into the first plurality of clusters.

13. The apparatus of claim 12, wherein in classifying the pixels of the coding unit into the first plurality of clusters, the processor is configured to execute the set of instructions to cause the apparatus to further perform:
- performing the classifying in a plurality of iterations, wherein in a (N+1)-th iteration, the pixels of the coding unit are classified according to clusters classified in a N-th iteration, N being an integer.

14. The apparatus of claim 13, wherein the processor is configured to execute the set of instructions to cause the apparatus to further perform:
- terminating the plurality of iterations when a change caused by the iterations to the first plurality of clusters is below a preset threshold.

15. The apparatus of claim 13, wherein the processor is configured to execute the set of instructions to cause the apparatus to further perform:
- determining, from the plurality of iterations, a first iteration at which a cost associated with the classifying reaches a minimum value; and
- determining, according to classification results of the first iteration, palette entries in the palette table.

16. The apparatus of claim 13, wherein each of the plurality of iterations is performed using a different quantization parameter (QP) threshold.

17. A non-transitory computer-readable storage medium storing a set of instructions that are executable by one or more processors of a device to cause the device to perform a method for processing video content, the method comprising:
- classifying pixels of a coding unit into a first plurality of clusters; and
- determining, according to the first plurality of clusters, a palette table for the coding unit,
- wherein classifying the pixels of the coding unit into the first plurality of clusters comprises:
  - determining a second plurality of clusters, the second plurality of clusters corresponding to palette entries in a palette predictor of the coding unit, respectively; and
  - classifying, according to the second plurality of clusters, the pixels of the coding unit into the first plurality of clusters.

* * * * *